April 6, 1937.  L. A. SAFFORD  2,076,164

PISTON RING

Filed March 15, 1934

INVENTOR
Lewis A. Safford
BY
H. C. Gieseng
ATTORNEY

Patented Apr. 6, 1937

2,076,164

UNITED STATES PATENT OFFICE 2,076,164

PISTON RING

Lewis A. Safford, Watertown, N. Y., assignor to The New York Air Brake Company, New York, N. Y., a corporation of New Jersey Application March 15, 1934, Serial No. 715,578

5 Claims. (Cl. 309—46)

This invention relates to lap joint piston rings and has for its principal object the production of rings of this character that will maintain a perfectly tight seal regardless of the extent of overlap of the ends. It has been a further object to provide such a ring that will be comparatively simple to machine and, therefore, quite economical to produce.

Many attempts have been made to produce lap joint piston rings capable of expanding and thus reducing the overlap to offset wear without diminishing the effectiveness of the seal. These attempts have in many cases met with fair success but usually at the expense of such accurate machining as to add materially to their cost. A common difficulty encountered with prior rings of this sort is that a slight gap is produced between the lapped ends as they open out so that leakage occurs as the rings wear. These objections have been overcome by the present invention.

Other objects and advantages of the invention will appear from the detailed description of an illustrative embodiment of the same which will now be given in conjunction with the accompanying drawing, in which.

Figure 1:
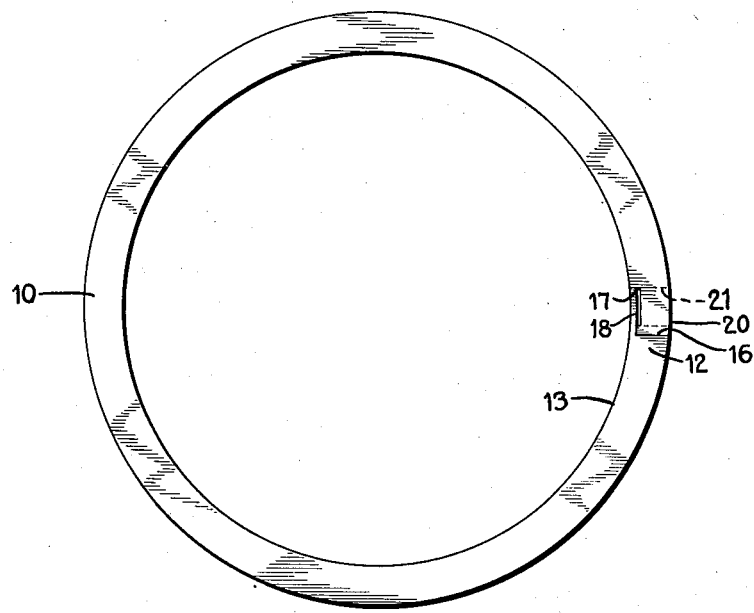
Fig. 1 is a face view of a completed ring embodying the features of the invention.
Figure 2:
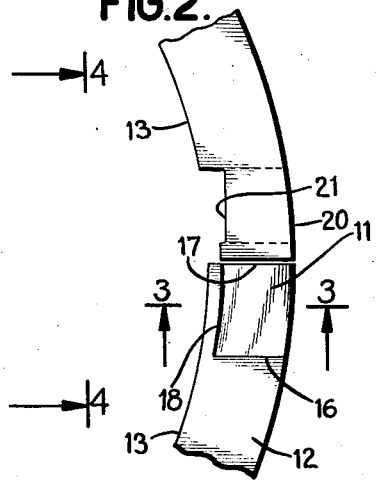
Fig. 2 is an enlarged face view of the ends of the ring, shown spread apart.
Figure 3:
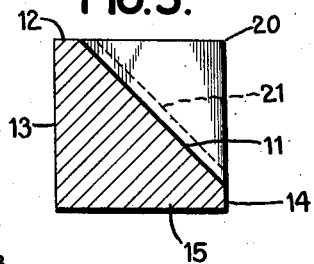
Fig. 3 is a transverse section through one of the ends of the ring taken along the line 3—3 of Fig. 2.
Figure 4:
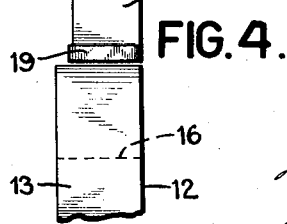
Fig. 4 is an inside view of the ends of the ring taken along the line 4—4 of Fig. 2.

Referring now to the drawing, the ring designated generally by the character 10 may be formed of any of the usual materials employed in the production of piston rings. It is preferably square in cross-section, although, if desired, it may be of any suitable rectangular section. One of the overlapping ends is provided with a surface 11, arranged at an angle of 45° to the face of the ring when the latter is of square cross-section. If the ring section is of other form, the inclination of the surface may be different. This surface preferably extends from a point on the face 12, some distance in from its line of intersection with the inner surface 13 of the ring, to a point on the outer surface or periphery 14 some distance from its line of intersection with the bottom face 15. This avoids the production of sharp edges at the sides of the surface 11. As indicated in Figure 2, the surface 11 is curved from the shoulder 16 to the end 17 along the arc of a circle having its center at the axis of the ring. Thus, the side or edge 18 of the surface is concentric with the inner surface of the ring. However, in a transverse direction the surface 11 is straight, as best shown in Figure 3, so that it is in effect generated by a straight line moved along an arc curved about the axis of the ring.

The other of the overlapping portions of the ring is provided with a narrow surface 19 at its end adapted to cooperate with the surface 11. Surface 19 may be simply a sharp edge or line of negligible width although it is considered preferable to make it about one thirty-second of an inch wide or even slightly wider, i. e., in a direction circumferential of the ring. If formed sufficiently narrow it may be made flat or straight in both directions while if it is given a substantial width, it may advantageously be curved in a manner similar to surface 11. The form and arrangement of the surface 19 is such that the triangular section formed between it and the corner or edge 20 is complemental to any radial section through the first described overlapping end, so that the combined area of these portions, regardless of the extent of overlap, is always equal to that of any regular section through the ring and the distance from the corner 20 to the diagonally opposite corner will always remain the same. This is made possible by the curvature of the surface 11. The remaining portion of this end of the ring is relieved to any extent desired by the provision of a surface 21 set in with relation to surface 19. This affords a clearance between surfaces 11 and 21 at all times and makes it unnecessary to form the surface 21 with any degree of accuracy. The error or inaccuracy permissible in the formation of the surface 21 will depend largely upon the extent to which it is set in. Furthermore, this surface may be formed as an ordinary flat or plane surface. In this way the machining of the lap joint is greatly simplified.

It will be apparent that in the use of this improved ring a tight seal will always be maintained regardless of the position of the surface 19 on the surface 11. A transverse section through these surfaces will always constitute a full square or rectangle, depending upon the cross section of the ring, with no gap at any point. Therefore, as the ring wears and expands it will be effective until the entire overlap is taken up.

In the production of the ring illustrated, it will be understood that it is mounted upon a table or support inclined at an angle of 45° to the direction of relative movement between the table and suitable milling cutters. The surface 11 is preferably formed by a radius milling cutter, i. e., one having curved cutting edges adapted to produce the desired curvature from the shoulder 16 to the end 17. Surface 21, on the other hand, may be formed by an ordinary straight edged milling cutter while surface 19 may be formed by a straight cutter or a radius cutter, as desired, depending largely upon the width of the surface and the accuracy of the fit required. The entire joint may be formed in a single operation by utilizing a saw and milling cutter side by side to sever the ring and form surface 11 while a stepped milling cutter is mounted in an opposed relation to simultaneously form the surfaces 19 and 21, all upon a single relative movement between the ring and cutters. On the other hand greater accuracy may be obtained without necessitating accurate machining of the cylinder from which the rings are cut if two separate operations are performed, utilizing a saw upon each operation, as explained in the pending application of Robert S. Newton, Ser. No. 707,675, filed January 22, 1934.

While a specific form of ring embodying the features of the invention has been described in considerable detail, it will be understood that various modifications may be made without departing from the general spirit and scope of the invention.

What I claim is:

1. A lap joint piston ring having a pair of overlapping legs the leg at one end of the ring being provided with an arcuate surface extending the full length of the leg and curved about the center of the ring, and the extreme end of the other leg of the ring being provided with a narrow substantially flat surface set-out beyond the remainder of said other leg and arranged to cooperate with said arcuate surface.

2. A lap joint piston ring having the leg at one end of the ring provided with an arcuate surface curved about the center of the ring and inclined at an angle from the outer periphery of the ring toward one face, and having the other leg of the ring provided at substantially its extreme end with a narrow substantially flat surface set-out beyond the remainder of said other leg and arranged to cooperate with said arcuate surface.

3. A lap joint piston ring having complemental, overlapping legs, one of said legs having a narrow substantially flat surface at substantially its extreme end disposed diagonally with respect to the face and periphery of the ring and arranged to cooperate with any portion of corresponding width of a broader surface disposed at a similar angle and provided on the other leg.

4. A lap joint piston ring having complemental, overlapping legs, said legs having contacting surfaces that are straight along a transverse line from one face toward a curved circumferential surface of the ring, one of said contacting surfaces being curved about the center of the ring, and one of said surfaces extending the full length of its respective leg and being of considerably greater circumferential extent than the other.

5. A lap joint piston ring having complemental, overlapping legs, said legs having contacting surfaces that are straight along a transverse line from one face toward a circumferential surface of the ring, one of said legs having a narrow substantially flat contacting surface at substantially its extreme end and a relieved portion inwardly of said surface adapted to provide a clearance at all times with the other leg.

LEWIS A. SAFFORD.